United States Patent [19]
Athanas et al.

[11] Patent Number: 5,828,858
[45] Date of Patent: Oct. 27, 1998

[54] WORM-HOLE RUN-TIME RECONFIGURABLE PROCESSOR FIELD PROGRAMMABLE GATE ARRAY (FPGA)

[75] Inventors: Peter Athanas; Ray A. Bittner, Jr., both of Blacksburg, Va.

[73] Assignee: Virginia Tech Intellectual Properties, Inc., Blacksburg, Va.

[21] Appl. No.: 714,348

[22] Filed: Sep. 16, 1996

[51] Int. Cl.$^6$ .............................................. G06F 15/177
[52] U.S. Cl. .......................................... 395/311; 395/284
[58] Field of Search ................................... 395/311, 653, 395/284

[56] References Cited

U.S. PATENT DOCUMENTS

| | | | |
|---|---|---|---|
| 5,105,424 | 4/1992 | Flaig | 370/94.1 |
| 5,175,733 | 12/1992 | Nugent | 370/94.3 |
| 5,497,498 | 3/1996 | Taylor | 364/489 |
| 5,509,128 | 4/1996 | Chan | 395/311 |
| 5,535,342 | 7/1996 | Taylor | 395/307 |
| 5,535,406 | 7/1996 | Kolchinsky | 395/800.1 |
| 5,583,990 | 12/1996 | Birrittella | 395/200.01 |
| 5,671,432 | 9/1997 | Bertolet | 395/311 |
| 5,701,416 | 12/1997 | Thorson | 395/200.15 |
| 5,745,734 | 4/1998 | Craft | 395/500 |

*Primary Examiner*—Eric Coleman
*Attorney, Agent, or Firm*—Whitham, Curtis & Whitham

[57] ABSTRACT

Higher performance is gained through a new architecture which implements a new method of computational resource allocation, utilization and programming based on the concept of Worm-hole Run-Time Reconfiguration (RTR). A stream-driven Worm-hole RTR methodology extends contemporary data-flow paradigms to utilize the dynamic creation of operators and pathways, based upon stream processing in which parcels of data move through custom created pathways and interact with other parcels to achieve the desired computation. These parcels independently allocate the necessary computing resources and data paths as they navigate through the platform. The Worm-hole RTR platform consists of a large number of configurable functional units that perform the custom computations and rich, configurable interconnection pathways between the functional units. Once a computational pathway has been established (sensitized) by the head of the stream parcel, data are processed through the pathway with zero overhead. All ports entering the computing platform serve both to configure operations and pathways and to pass computational data streams. As a result, programming and configuration is not limited to a single port. Configuration through multiple independent ports allows greater concurrency, faster reconfiguration, and fewer computational dependencies, all with relatively low cost in silicon.

12 Claims, 6 Drawing Sheets

WORM-HOLE RUN-TIME RECONFIGURABLE PROCESSOR FIELD PROGRAMMABLE GATE ARRAY (FPGA)

BACKGROUND OF THE INVENTION

1. Field of the Invention

The present invention generally relates to the field of computers, digital signal processing, and numeric computation and, more particularly, to a run-time reconfigurable computing platform as a means of achieving higher computational performance and higher effective computational resource utilization.

2. Background Description

The growth of available computing power to date can largely be attributed to continuing breakthroughs in materials and manufacturing. In order to increase computing capacity beyond these physical bounds, new computing paradigms must be developed that make more efficient use of existing manufacturing technologies. Most computing machines use a centralized control system in which a global control unit directs the allocation and utilization of computing resources. This concept is common to current superscalar microprocessors, such as the Intel Pentium Pro®, and to current field programmable gate arrays (FPGA), such as the Xilinx XC6200 series, alike. In the case of the Pentium Pro®, a central controller on the chip reads instructions and data and then controls the flow of operand data through the various fixed computational resources available. An FPGA device can operate in this mode, automatically loading a configuration through a single port and then processing based on that configuration. An FPGA can also be programmed by an external controller through a single port to perform various tasks, and different parts of the FPGA can even perform different tasks at the same time. The port can be multitasked between several external controllers, but all must access the resources of the chip through a single global control scheme on the chip. Thus, it is impossible for more than one external controller to reconfigure the resources available on the FPGA simultaneously.

Many applications to which current Custom Computing Machines (CCMs) have been applied are inherently data flow in nature. Applications such as genomic sequence scanning, fast Fourier transform (FFT) calculations, text searching and computer vision consist of highly concurrent, spatially localized algorithms characterized by large amounts of data that must be processed in real-time. Processing of this nature can benefit from the distributed computing power possible with a data flow computing paradigm. It would seem reasonable then to implement data flow graphs on such architectures. Indeed, progress has been made in writing compilers to accomplish this.

Unfortunately, many existing CCM architectures have been implemented with traditional FPGA design roles in mind. Such features as single bit computational cells, global control structures and restrictive routing resources that are sufficient for providing glue logic prove prohibitive to efficient data flow implementation. Further, the amount of overhead required to configure a contemporary FPGA is over inflated by this bit level approach. This adversely impacts not only the density of computing elements in the circuit silicon, but also the reconfiguration time of these chips. Since faster reconfiguration time can translate directly into faster computation, the relatively slow reconfiguration times of many FPGAs is a great hindrance to competitive computing speeds. Also, the speed of operation for designs mapped to most of these devices is slow compared to application specific integrated circuit (ASIC) solutions, making comparisons less than favorable. Worse yet, the maximum attainable clock rate varies greatly with the design being implemented. Such variations can be disastrous for a real-time system and can prove troublesome for any rapidly reconfigurable system that is designed to maintain a processing schedule (such as a deeply pipelined system).

SUMMARY OF THE INVENTION

It is therefore an object of the present invention to provide a new process for performing numerical computation and digital signal processing in which the computing platform can partially reconfigure for one task while simultaneously performing computations for another task.

According to the invention, higher performance is gained through a new architecture which implements a new method of computational resource allocation, utilization and programming based on the concept of Worm-hole Run-Time Reconfiguration (RTR). The concept is derived from a known method of routing data through a network known as "worm-hole" routing in which routing involves a path through the network from the source to the destination that is maintained until the entire data set has been delivered. The invention enhances this concept with a stream-driven Worm-hole RTR methodology which extends contemporary dataflow paradigms to utilize the dynamic creation of operators and pathways. Worm-hole RTR is based upon stream processing in which parcels of data move through custom created pathways and interact with other parcels to achieve the desired computation. Much like worms tunneling through an apple, these parcels independently allocate the necessary computing resources and data paths as they navigate through the platform. The Worm-hole RTR configurable platform consists of a large number of configurable functional units that perform the custom computations and rich, configurable interconnection pathways between the functional units. Once a computational pathway has been established (sensitized) by the head of the stream parcel, data are processed through the pathway with zero overhead.

The advantage of this approach as applied to a computing platform is that several stream computations can simultaneously execute with little or no overhead associated with control. In contrast to contemporary digital signal processors (DSPs) and control-driven processors, the instruction-fetch bottleneck is eliminated by distributing control to each of the stream parcels. With a Worm-hole decentralized control strategy, all ports entering the computing platform serve both to configure operations and pathways and to pass computational data streams. As a result, programming and configuration is not limited to a single port (like many of the architectures described above). Configuration through multiple independent ports allows greater concurrency, faster reconfiguration, and fewer computational dependencies, all with relatively low cost in silicon.

There is a fundamental difference between the centralized control system designs employed by the previous examples and the invention based on the Worm-hole RTR approach. The Worm-hole RTR architecture allows multiple entities to control, allocate and utilize resources from a common pool simultaneously, without multitasking or time slicing. For this reason, Worm-hole RTR is referred to as a distributed control approach, rather than a global control approach as used by the previous two examples. It is this ability that allows a Worm-hole RTR system to better utilize available resources, achieve faster reconfiguration times in FPGA devices and to achieve higher computational densities than other devices because of its distributed communication philosophy.

Parallel processing machines exist that can perform multiple independent tasks simultaneously. However, the method through which a Worm-hole RTR system communicates those tasks among the computational resources is unique. Worm-hole RTR distributes programming information through the system using the same paths used by data. While the same could be said of any bus oriented microprocessor, the difference is that the programming information is not only transmitted through the same channels (as in a bus oriented architecture), but the programming information actually steers itself through the system at the same time. Thus, the programming information controls its own path through the system, rather than the system controlling the path of the programming information.

As in other configurable computing approaches, deep computational pipelines can be constructed using the Worm-hole RTR approach to give way to high throughput at the expense of latency. Synchronization between streams or isolated computational threads is a natural consequence of the data-flow model; i.e., computations at the functional unit do not proceed until all relevant data is present. Computation begins as soon as all dependencies are satisfied.

Another advantage of this approach relates to power consumption. Since no additional control is needed once the pathways are established, nearly all power is attributed towards computation. Thus, power consumption is directly proportional to computational load present on the platform. These considerations are rudimentary when considering wireless or mobile applications.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
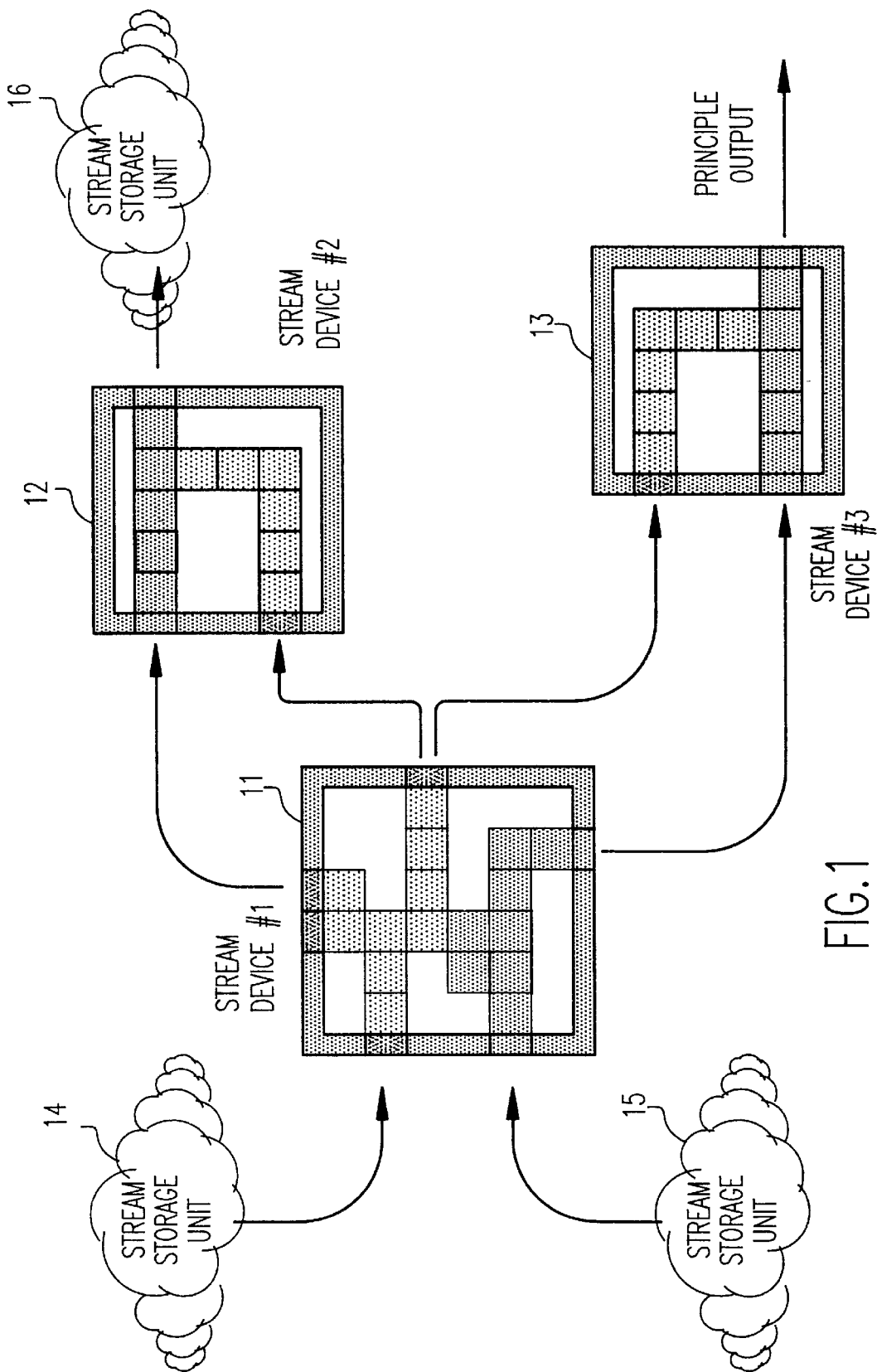
FIG. 1 is a block diagram showing the conceptual flow of data through a Worm-hole RTR computing platform according to the invention.

Referring now to the drawings, and more particularly to FIG. 1, there is shown the major components in a Worm-hole RTR platform. In this conceptual illustration, there are three stream devices 11, 12 and 13 and a plurality of stream storage units 14, 15 and 16. Data streams are processed simultaneously in the stream devices, as indicated by the arrows representing the data flow. The squares within the stream devices represent resources allocated by the streams.

Worm-hole RTR addresses the problems of current FPGAs and, in future applications, provides a run-time reconfiguration method for large scale systems. It is useful as a method for rapidly programming data flow graphs into large systems using a distributed control scheme. However, Worm-hole RTR is not limited to data flow computation and can be adapted to work with other computing environments. The essence of the Worm-hole RTR concept is formed from independent self-steering streams of programming information and operand data that interact within the architecture to perform the computational problem at hand. The method of computation itself can be compared to that of "pipenets", as discussed by K. Hwang et al. in *Advanced Computer Architecture*, McGraw-Hill (1993), at pages 442–446, in which multiple intersecting pipelines (streams) are formed within the processor to perform a task. One application of Worm-hole RTR is as a high speed configuration methodology for such a system.

Figure 2:
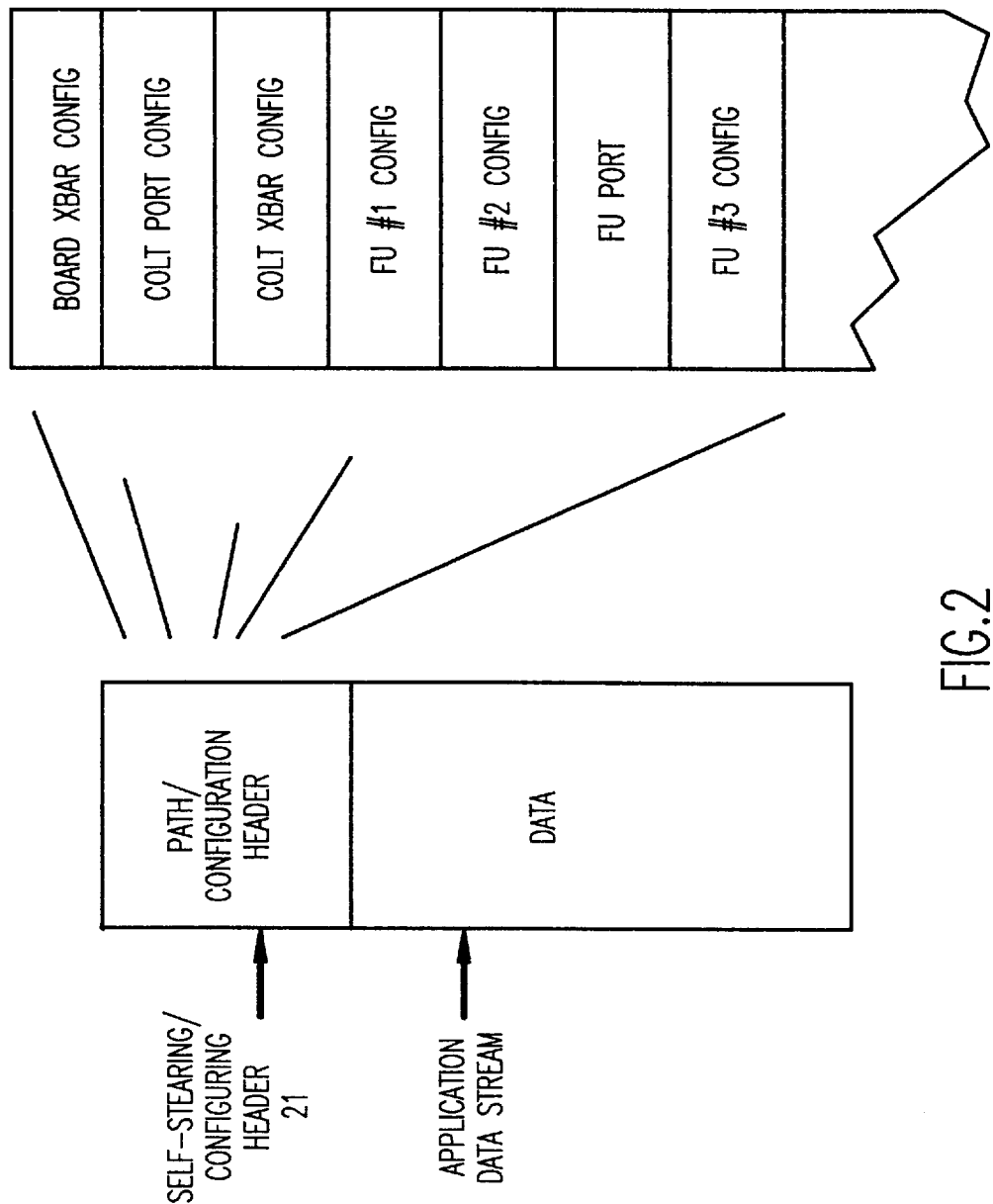
FIG. 2 is a block diagram showing a sample data stream containing self-configuring header information and data.

Worm-hole RTR is based on the stream concept, which is an extension of the more common definition of the term. In this case, a stream is a concatenation of a programming header and operand data. The programming header is used to configure a path through the system as well as to configure the operations to be performed by the various computational elements along the path. The logical depiction of a stream is provided in FIG. 2. Data are presented to the platform in the form of a stream, which is defined as a logical unit containing an ordered sequence of a variable number of words. Note that the stream can vary from zero words to (theoretically) an infinite number of words. Streams serve as the means of all data movement in the platform. The lead portion of a stream packet contains a variable length header 21 which is responsible for allocating the computational pathways, and for configuring the computational elements when necessary. The stream is self-steering and, as it propagates through the system, configuration information is stripped from the front of the programming header and used to program the unit at the head of the stream. The stream header is composed of an arbitrary number of packets of programming information. A header can be of length zero (for streams requiring no customization) to an arbitrarily long sequence of words (for major reconfiguration). Each packet contains all the information needed to configure a designated unit in the system. The composition and lengths of the packets are variable so that different packet types may coexist within the same steam header and hence heterogeneous unit types may be traversed by a given stream.

Intermediate computational results are stored in stream storage units. The stream storage units not only contain physical storage, but also provide other functions such as synchronization and simple scatter/gather operations. When the computations are complete, data leaves the platform in the form of a stream. This output stream can then be buffered appropriately for departure.

The exact path taken by the stream through the system is determined at run-time, allowing several competing processes to allocate resources as they become available. Because the streams independently guide themselves through the system using the information contained in the stream header, the configuration process is inherently distributed. Multiple independent streams can wind their way through the system simultaneously. The streams can all originate from different external controllers that are configuring different functions using resources from the same system simultaneously. Likewise, part of the system can be used to process data operands while any set of neighboring units can be accepting configuration data from the header of one or more other streams, thus allowing overlap of the configuration/execute cycle and of process multitasking within the same system. These possibilities are all possible due to the distributed nature of Worm-hole RTR.

In a specific implementation of the invention, an architecture has been developed which specifically addresses the application of digital signal processing (DSP). This implementation demonstrates the Worm-hole RTR approach to other applications, including many new concepts in the design of CCMs, including fundamental approaches to computation, communication and reconfiguration.

Figure 3:
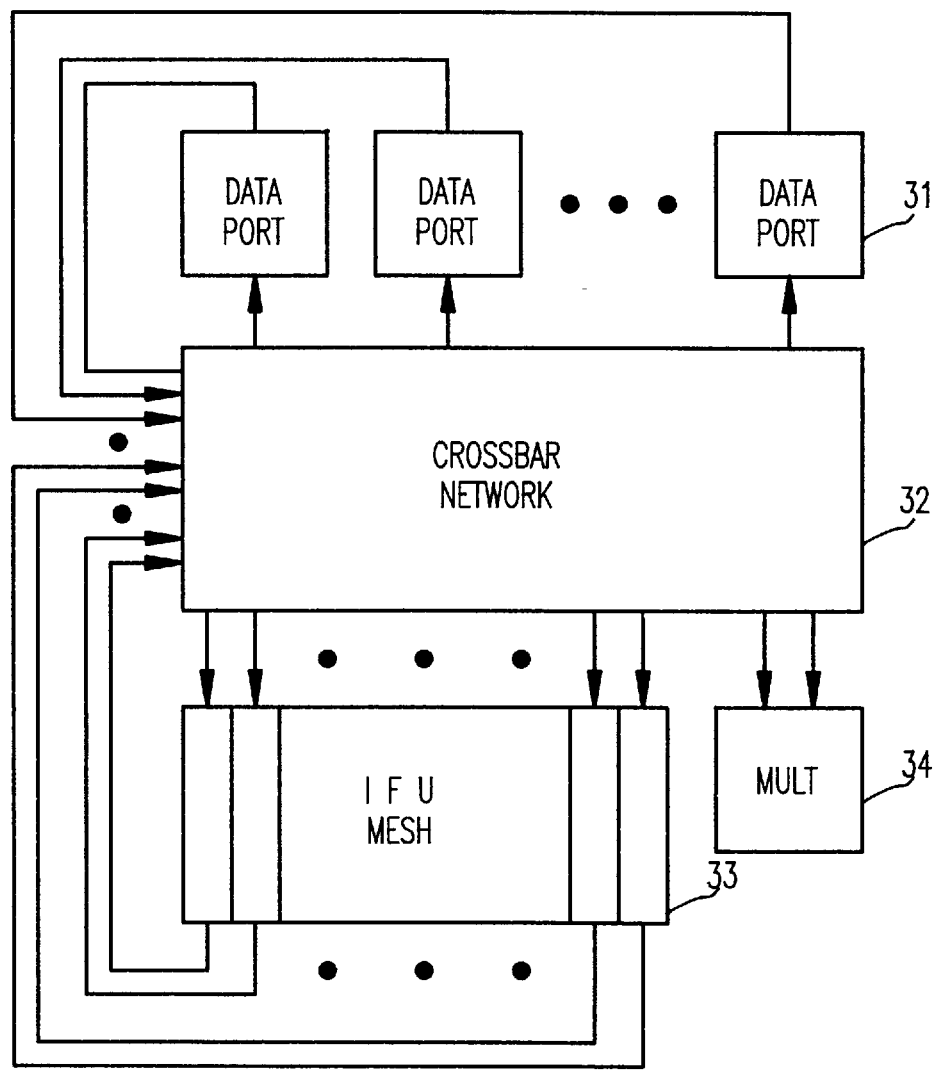
FIG. 3 is a high level block diagram showing the chip architecture of a specific implementation of the invention.

FIG. 3 is a block diagram of this specific implementation which comprises four main subsystems; the data ports 31, the crossbar network 32, the interconnected functional unit (IFU) mesh 33, and the multiplier 34. With the assumption that computation will be performed at the word level rather than the bit level, the more traditional array of single bit computational cells has been foregone in favor of a system that is more oriented toward configuring long pipelines of word sized operands around the chip. While this could have been accomplished using a classic mesh architecture, the run-time reconfiguration of data flow graphs should benefit from the added connectivity. For example, some functional units may be processing data while others are being configured with the next data steam. Ideally, the configuration of the next data steam would complete just before the inputs to that data stream are ready. The Von Neumann-like configuration/execution cycle would continue until the final outputs from the data flow graph have been computed. During the process, however, hardware resources could become fragmented as different graph topologies are loaded onto the chip.

In a pure mesh, a good planning strategy is to carefully predetermine the size and shape of all data streams that may need to coexist within the hardware resources at a given time for different possible execution scenarios. This has been done with contemporary FPGAs, such as those from Altera and, to an extent, the Xilinx XC6200 line. In a diverse application, this would inevitably lead to internal fragmentation within the allocation blocks of the mesh since each data stream would have different resource requirements. By using the crossbar 32, this situation can be avoided since it is possible to reach any part of the chip once the data has reached the crossbar. Thus, the processing resources need not be allocated in blocks or subsections; rather, different data streams can coexist in the mesh 33, in almost any random pattern. The exact resource allocation distribution can even be determined at run-time.

In a specific implementation of the invention as illustrated in FIG. 3, there are six bi-directional data ports 31. Each port is twenty pins wide, sixteen bi-directional pins for operands and four bi-directional pins for control. Each port supports both read and write operations as well as five modes of operation, two of which are used strictly for programming. The three data modes differ mainly in the operation of the port when it is in input mode. These modes were created with possible styles of usage in mind.

One style of use views the architecture as a relatively static pipeline for dedicated use in real-time systems. In this case, data is fed into the chip at the acquisition rate and processed with a guaranteed latency. No complex flow control is necessary as only simple conditional execution is required and no reconfiguration is required. This mode is referred to as "raw mode". It accepts data unconditionally and merely injects it directly into the chip.

Another style of use is in a more complex system where run-time reconfiguration occurs frequently and flow control is required to prevent data loss during the programming latency. Such a system may still have relatively simple conditional execution and so requires only simple queuing of the data operands. This style of use is addressed by "synchronization mode", which helps align operand data as it enters so that the operands are aligned when two intersecting pipelines meet within the chip. Operand acceptance is synchronized with any subset of the other data ports on the chip.

The third style of use, referred as the "looped mode", involves run-time reconfiguration coupled with complex looping structures and conditional execution. The corresponding data port mode operates much as the second mode with the additional constraint that it allows only one data operand to enter each of the data ports in the subset at a given time. No new data is allowed to enter until valid results have left the chip.

The on-chip crossbar network 32 is the primary means of deep pipeline construction. The crossbar is organized as a twelve-input, sixteen-output network supporting 16-bit data paths. A single 16-bit input comes from each data port and the bottom of each column in the mesh 33. Two additional inputs come from the high and low words of the output of the dedicated multiplier 34. Single outputs go to each data port and double outputs go to the top of each column of the mesh 33 as well as to the multiplier 34. The crossbar 32 provides nearly full connectivity from any input to any output. The only exception to this being that direct connections from one data port to another are not supported. Such connections would be a waste of chip resources in that all pipelines that consume input/output (I/O) resources should perform some type of computation before leaving the chip.

The design of an architecture based around Worm-hole RTR is conducive to concurrent processing since the units can be designated independently of one another. Unlike the slave-like execution units in a conventional microprocessor, the design of units for use in a Worm-hole RTR architecture must be designed with a degree of intelligence in order to support the feed forward control strategy. This concept is best illustrated by the crossbar 32. New stream(s) may enter any or all of the inputs of the crossbar 32 at any time. Thus, the control mechanism of the crossbar must be a distributed system capable of simultaneously switching any set of inputs to a set of outputs, as well as supporting broadcast modes. To accomplish this, each of the crossbar outputs is assigned a unique address. Each switching point from input to output in the crossbar is designed with a small state machine. The state machine monitors the input to the crossbar for a stream header containing a packet designated for the output address that it is associated with. Upon receipt of such a packet, the state machine triggers the switching mechanism between the input and the output and allows the remainder of the stream to propagate through. Because the state machines act independently of one another, the problem of coordinating all possible combinations is avoided. The only point of common communication between the state machines occurs when an input has a pre-existing switch connection to a given output. Only one input may be forwarded to a given output at a time. Thus, when a new input requests the use of that output, a clearing signal is sent to all state machines associated with that output, allowing the new input to gain exclusive control of the crossbar output. In the specific implementation described, there are 156 state machines. These state machines, however, are quite small, and the majority of the silicon area consumed by the crossbar is due to routing.

The specific embodiment is based on an absolute addressing scheme, but those skilled in the art will recognize that Worm-hole RTR systems could be designed around a relative addressing scheme. A relative addressing scheme in the mesh 33, for example, would use local cues for the direction of stream propagation from a given function unit (e.g., north, south, east or west, or a combination of these). In the specific implementation, there are sixteen "cardinal" directions from which to proceed from input to output but, again, relative addressing could have been used. The advantage of a relative addressing scheme is the same as that of relocatable code in a microprocessor. A stream could be injected into the Worm-hole RTR processor and it could then map itself onto the hardware starting from any point.

Although the Worm-hole RTR concept can incorporate a relative addressing design strategy, it was decided in the design of the specific implementation being described that an address that was unique throughout the chip would be given to each unit. These addresses are used to distinguish units on a local basis, in contrast to a global strategy such as is used in a random access memory (RAM). A unit will only respond to a packet containing either its unique address or the broadcast address. This was done to better support and control the idea of broadcast programming and divergent streams. A divergent stream is created by configuring a unit to forward the stream in more than one direction simultaneously. The addresses of following packets in the stream header are chosen to program selected units along the paths that have been newly created. This is one method through which a single stream can program multiple data paths. Although the stream is forwarded in multiple directions, the addresses allow the programmer to direct packets to specific units along the paths, thereby maintaining control over the individual configuration of each unit. Broadcast programming allows a single stream to diverge into two or more streams by programming units that are adjacent in the network with the same packet. This is useful for programming repetitious structures quickly. The addressing mechanism then allows the programmer to control the path that the stream will take to exit the structure once it has been configured.

Figure 4:
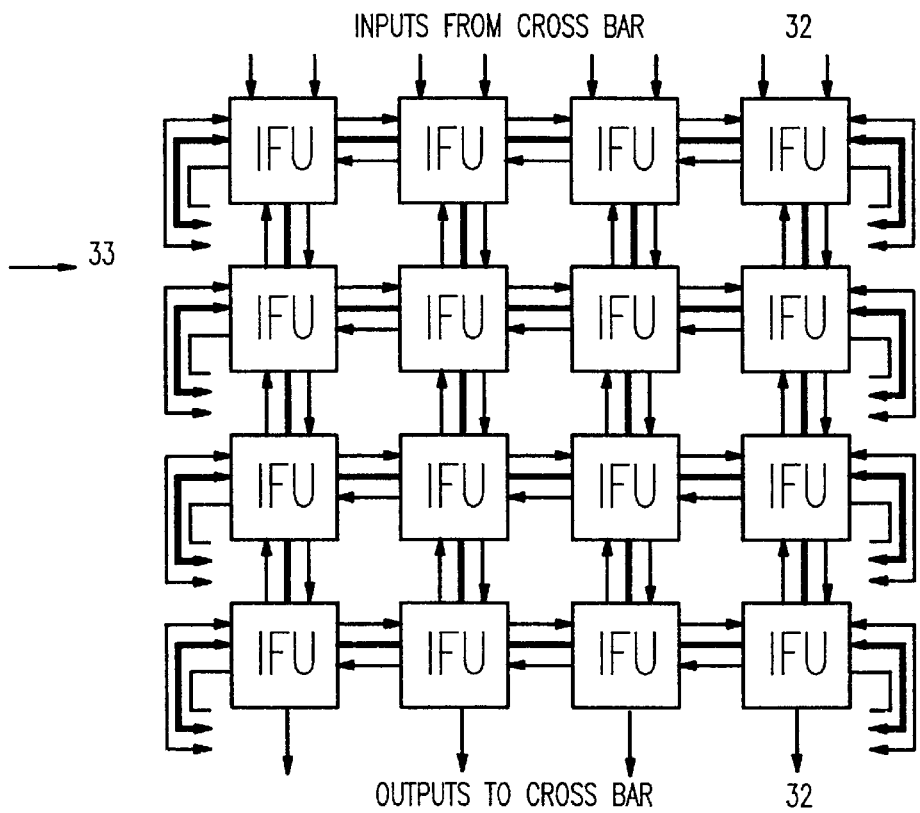
FIG. 4 is a block diagram of the functional unit mesh used in the implementation FIG. 3.

In the specific implementation illustrated in FIG. 3, the computational mesh 33 consists of a 4×4 array of interconnected functional unit (IFU) cells 41, as shown in FIG. 4. While it would have been preferable to attach each IFU to the crossbar individually, the increase in crossbar size using contemporary planar very large scale integrated (VLSI) technology was prohibitive. The top of each column of the mesh receives two inputs from the crossbar 32. One output from the bottom of each column is fed back into the crossbar 32. In most applications, some degree of data reduction will be performed within the mesh as pipelines interact, thus justifying the reduced output connectivity. Each IFU has four nearest neighbor connections. IFUs 41 along the top of the mesh 33 receive their northern (i.e., top) local inputs and skip bus connections from the crossbar 32. First row IFU northern local outputs are left unconnected. The eastern and western (i.e., right and left, respectively) edges of the mesh are connected as if they were nearest neighbors, for a toroidal structure.

The skip bus is another innovation that greatly aids in connectivity within the mesh. It consists of bi-directional bus segments that run between nearest neighbors within the mesh. The difference between skip bus connections and the normal local connections is that the skip bus segments can be individually programmed to go in either direction. Furthermore, the segments can be linked together, providing a data path between arbitrary IFUs within the mesh. The path formed is not clocked so that data can move through it in a single clock pulse. The skip bus sets the mesh apart from a normal systolic array in that it allows the more complicated nodal structures present in a data flow graph to be mapped onto the mesh more easily. Without the skip bus, IFUs would need to be sacrificed as routing resources for some implementations. In a word oriented architecture where there are fewer but larger computational elements, such sacrifices need to be kept to a minimum.

Figure 5:
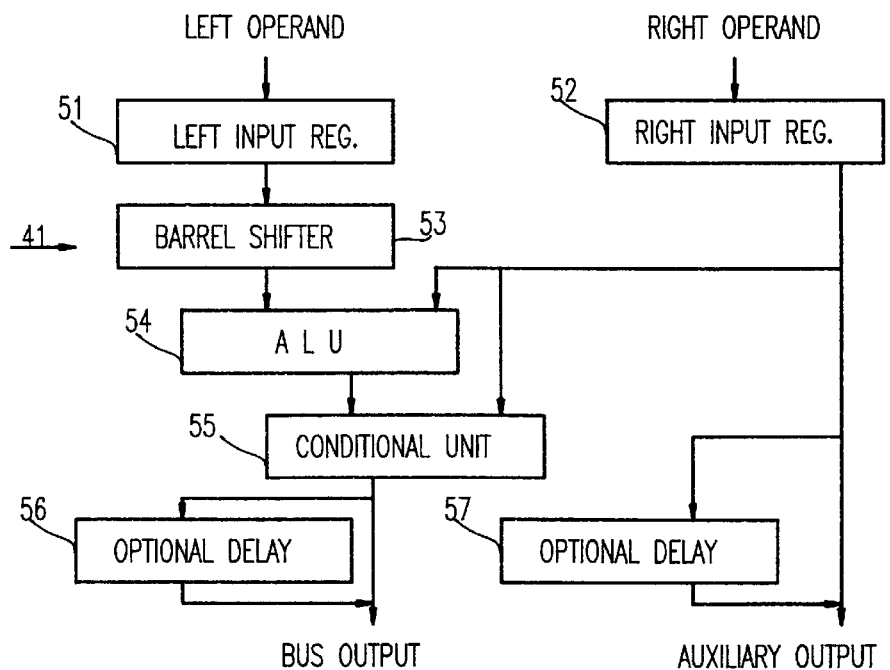
FIG. 5 is a block diagram of a functional unit of the functional unit mesh of FIG. 4.

The IFU mesh 33 is the reconfigurable core of the device. It consists of functional units surrounded by the control and busses necessary to provide the nearest neighbor and skip bus connectivity. The functional unit (FU) is shown in FIG. 5 and has 16-bit left and right input registers 51 and 52, respectively, each of which can load an operand from any of the four nearest neighbor connections or from any of the four skip bus segments connected to the FU. The left input register 51 feeds into a barrel shifter 53 that can conditionally shift by 1, 2, 3, or 4 bits to the left or 1 bit to the right. The shifter 53 facilitates the implementation of multipliers and floating point arithmetic. The output of the shifter 53 and the right input register 52 feed into a programmable arithmetic logic unit (ALU) 54. The ALU 54 is based on a Propagate, Generate, Result structure as found on pages 150–154 in *Introduction to VLSI Systems*, by C. Mead and L. Conway and published by Addison-Wesley, 1980. It can be programmed to perform any binary operation of two bits between the two words. Also, there is a carry path that can be used to allow the unit to perform addition, subtraction, negation, shifting, and the like. The output of the ALU 54 and the right input register 52 then feed into the conditional multiplexer unit 55 which can be used to select between these two input based on the value of the conditional flag. Finally, the output of the conditional unit 55 passes through an optional output delay 56 before being released to the rest of the chip on the four nearest neighbor connections.

The output delay 56 and a second optional output delay 57 are used to help synchronize the execution path lengths of different pipelines so that the correct pairs of operands are matched at the right times where pipelines meet. Normally, a result is produced every clock cycle within the FU, but when the output delay is enabled, a two clock cycle latency is incurred. Again, an architecture with smaller computational elements could afford to sacrifice units for this purpose, but in a larger grained system, it is more cost effective in terms of area to include some provision to avoid the loss.

The auxiliary output from the FU merely forwards the value of the right input register 52. This capability is valuable for floating point arithmetic and assorted signal processing calculations. Each of the four skip bus segments attached to the FU can independently select direction to be either an input or an output. If the output direction is chosen, the value sent can be either the normal FU output, the auxiliary output, the value of the compass opposite skip bus segment or the value of the compass right skip bus segment.

Three flags also enter and leave the FU, each of which has similar routing capabilities to the normal data paths within the mesh 33. These flags are used for the carry in and carry out of the ALU 54, the shift in and shift out of the shifter 53 and input and generated conditional flag. The conditional flag can be generated from several sources including sign bits, carry out and the lower bits of the right operand for use in controlling the shifter 53. By using this one bit signal to affect the data path and computation within the FU, conditional execution can be controlled both by that FU and by other FUs. This includes the action of the shifter 53 and the selection chosen by the conditional unit 55.

Also, special provisions have been made within the FU to accommodate multiplication. As described by D. J. Magenheimer, L. Peters, K. W. Pettis and D. Zuras in "Integer Multiplication and Division on the HP Precision Architecture", *IEEE Transactions on Computers*, Vol. 37, No. 8, pp. 980–990, Aug. 1988, multiplication by a constant can be reduced to optimal shift/add trees. Multiplication by five, for example, can be expressed as 4x+x, which is merely a shift left by two followed by an addition. The structure of the FU allows this operation to be performed in a single clock pulse. Note that if a series of values must all be multiplied by the same value, then a pipeline can be reconfigured at run-time to multiply by that constant with very little overhead. Indeed, since each FU is capable of performing a shift and add in a single clock pulse, multiple multipliers could all be configured on the chip simultaneously. The exact number of multipliers possible would be dependent on the multiplicative constants desired. The extreme on the chip of this implementation would be the realization of sixteen multipliers in full operation simultaneously within the mesh 33 plus the dedicated multiplier 34 for a total of seventeen chip-wide.

Further, floating point arithmetic has been considered in the implementation of the FU. Input sources for the generation of the conditional flag have been included to aid in operations such as mantissa alignment and normalization. These can be used to control a conditional shift of the mantissa depending on the value of an exponent loaded into the right hand register 51 or to renormalize a mantissa after an addition operation. The same conditional flag can be forwarded to another FU that would then increment or decrement the corresponding exponent accordingly.

Inevitably, circumstances will arise when the multiplicative constant will need to change too quickly to justify the overhead of reconfiguring an FU to perform the operation. For these conditions, such as when performing a dot product, the multiplier 34 was incorporated. In this implementation, a single integer multiplier is made available via direct connection to the crossbar 32. While a multiplier could have been constructed from the mesh 33 of FUs, the relative size of such a multiplier compared to the size of a dedicated version, added to the frequency of multiplications in DSP type operations drove the decision to include the multiplier 34 in this implementation. The pipelined multiplier 34 accepts 16-bit operands and produces 32-bit results in two clock periods. Since the multiplier 34 inputs and outputs are directly connected to the crossbar 32, the results can be quickly routed to any part of the chip for further processing.

Conditional execution can be achieved using several different mechanisms. The appropriate mechanism or set of mechanisms to use depends on the characteristics of the branch in the data flow graph being processed.

If the graph to be executed is such that all operands are exclusively processed on one side or the other of the conditional graph, then the unused side of the conditional graph need never be configured onto the chip. Data boundaries can be drawn at the beginning and end of both sides of the conditional graph and only the side that is to be executed would be programmed into the chip at run-time (i.e., partial run-time reconfiguration). An example of such a situation would be two alternative formulas to be applied to a data set. The chip would only need to be configured with the formula to be applied in a given situation.

The distributed control stream offered by Worm-hole RTR also provides advantages for system scalability. Communication operations during both phases (configuration and execution) of stream processing are localized in nature. Thus, long latencies between distant units within the system can be effectively hidden through natural pipelining, allowing the overall speed of the system to increase over that of a centrally controlled machine. this concept can be easily taken to the extreme of using self-timed streams, where no global clock is needed at all. A clocking signal may be sent along each individual data path, and the transitions of that signal would indicate changes in the data along the path. The data could be buffered by a stream controller at the receiving end and fed into processing units in a more typical synchronous fashion if so desired. Further, the source and destination of the stream could be separated by arbitrary distances and the data channels themselves could be moderated by synchronization mechanisms that tolerate long latencies and are normally used only in Wide Area Networks (WANs), such as TCP/IP. Thus, the stream could be truly distributed, across the room or across the world, accessing distant farms of computing resources as they become available to create computation systems of truly global proportions. All the while, the processing elements themselves could be used at close to 100% utilization.

Figure 6:
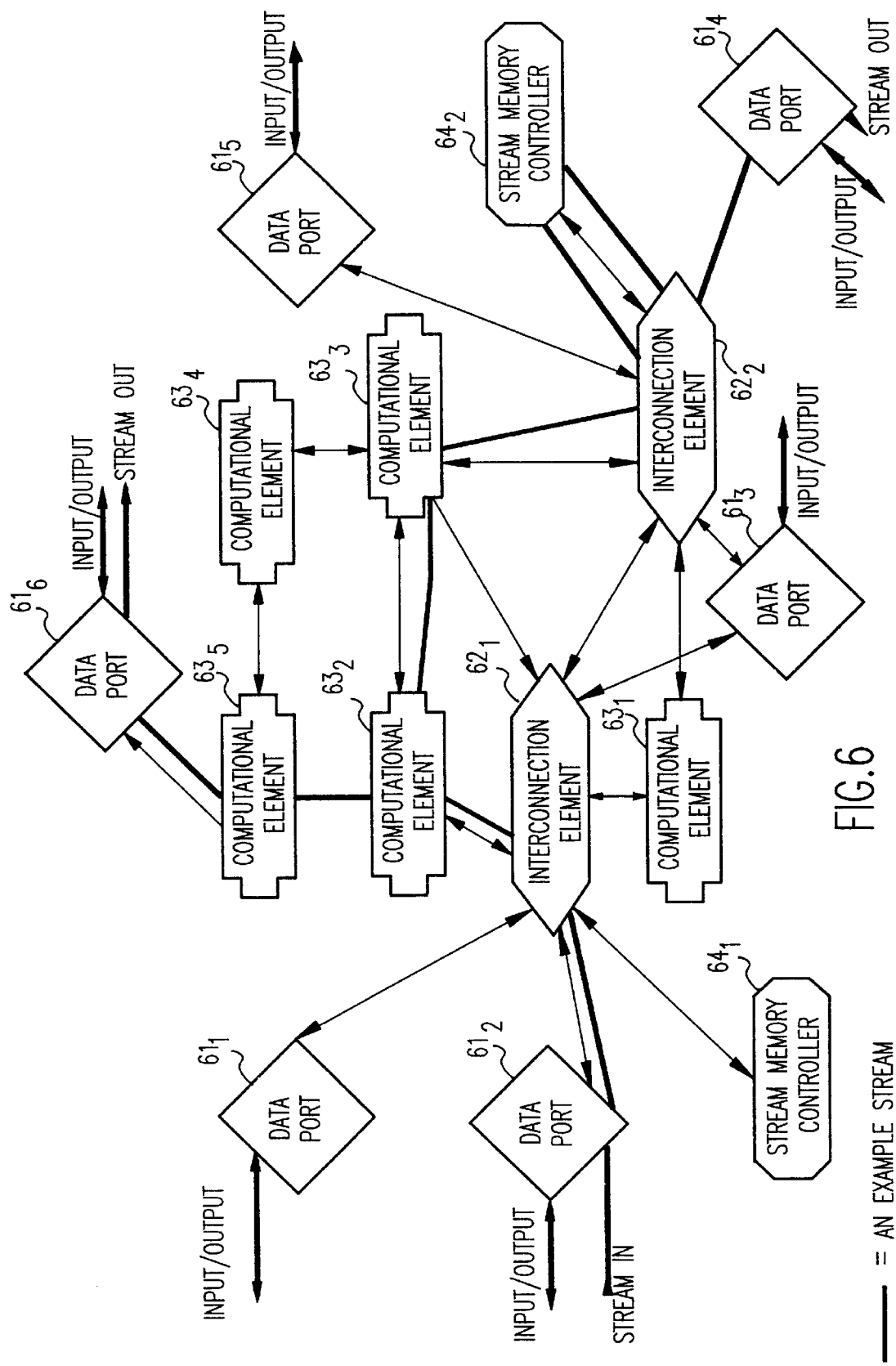
FIG. 6 is a block diagram of a generalized system illustrating the use of stream controllers to configure data flow in hardware.

The generalized system is illustrated in FIG. 6 which has a plurality of data input/output (I/O) ports $61_1$ to $61_6$. The I/O ports $61_1$ to $61_5$ are connected to one or more of a plurality of interconnection elements $62_1$ and $62_2$, each of which may be crossbar switches. The interconnection elements $62_1$ and $62_2$, in turn, are connected to one or more computational elements $63_1$ to $63_5$, at least some of which, computational elements $63_2$ to $63_5$ are connected in a mesh. The output of this mesh is connected to I/O port $61_6$. Connected to each of the interconnection elements $62_1$ and $62_2$ are respective stream controllers $64_1$ and $64_2$.

The localized nature of the communications involved with Worm-hole RTR allow different sections of the data flow graph being implemented to expand or contract dynamically at run time to utilize as much hardware as the current algorithm and existing system constraints allow. As different processes compete for hardware resources and the size of the physical machine increases or decreases, different portions of a given data flow graph could be implemented directly in hardware. For instance, if more hardware were added to a given system, it could be detected by the stream controllers $64_1$ and $64_2$ and used to configure more of the data flow graph directly in hardware, realizing an instant speedup with no modification or recompilation of the data flow "program" itself. An another example, the amount of physical resources in the system may remain the same, but a new process may be introduced. Existing processes on the machine could dynamically shrink the amount of code that is directly implemented in hardware to allow room for the new process to execute in a reasonable amount of time.

Figure 7:
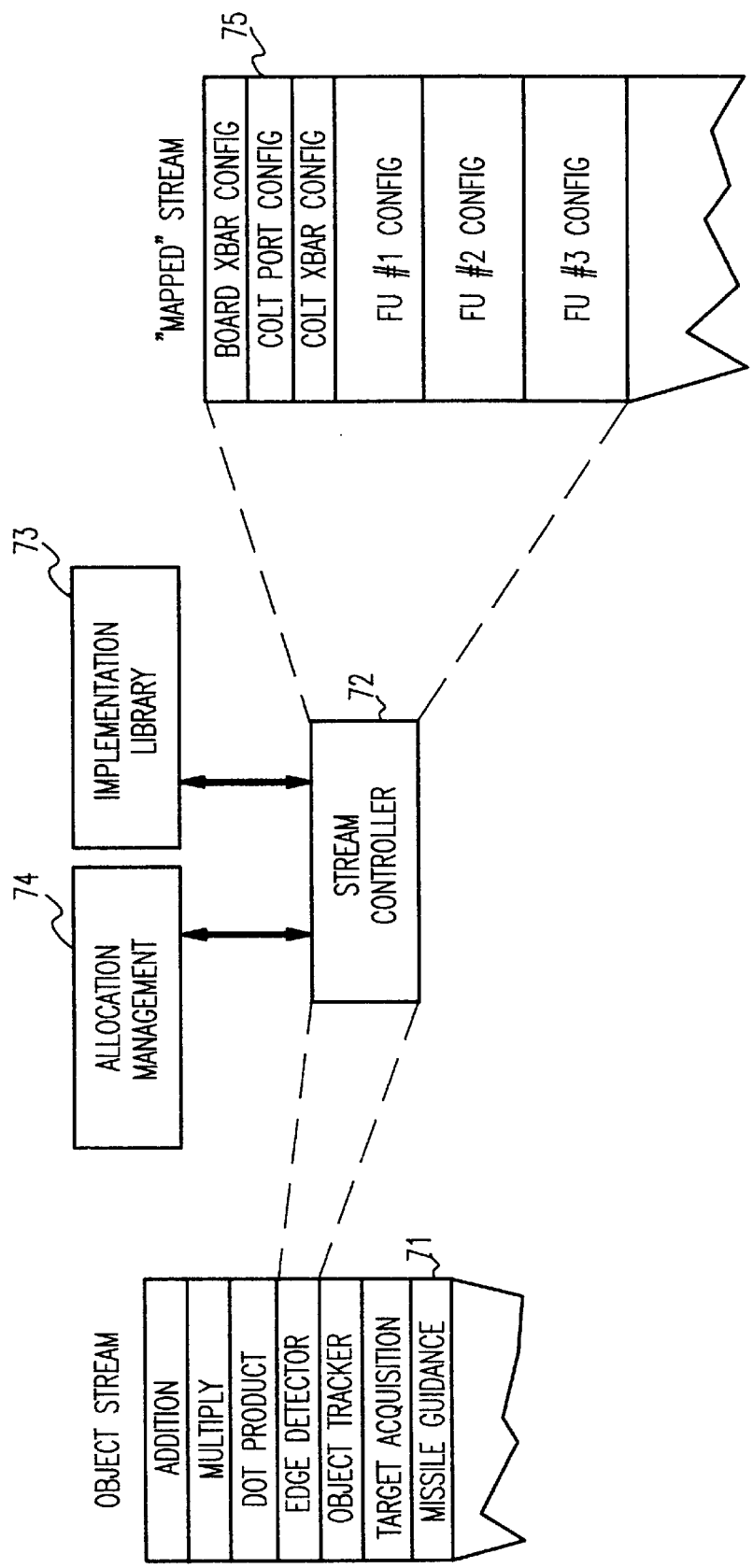
FIG. 7 is a block diagram showing the extension of invention to object oriented streams.

FIG. 7 shows the extension of this concept of dynamic process expansion and shrinking to allow the possibility of object oriented streams 71 in which the stream header simply contains "opcodes", each of which indicate the type of operation to be performed without necessarily dictating the exact piece of hardware to be used for implementation. A steam controller 72 could receive such a stream, compare the opcode against a library 73 of possible physical implementation strategies and then, based on an allocation management strategy 74, implement the most efficient method possible given available hardware resources by substituting the appropriate implementation into the stream header in place of the opcode to produce a mapped stream 75.

In this way, a Worm-hole RTR system could also implement the concept of generalized hardware in which the exact hardware to be utilized at run time need not be known at compile time. This applies not only to hardware resource availability, such as would be used for the dynamic expansion and shrinkage discussed, but it also opens the possibility of running a program on future hardware that has yet to be added to the system, or has yet to even have been invented, without having to recompile or recode. All that would be required is the addition of the implementation library for the new hardware to the system. Dynamic stream to hardware mapping by the steam controllers could then immediately utilize it at run time.

While the invention has been described in terms of a single preferred embodiment with modifications and extensions, those skilled in the art will recognize that the invention can be practiced with modification within the spirit and scope of the appended claims.

Having thus described our invention, what we claim as new and desire to secure by Letters Patent is as follows:

1. A data stream driven Worm-hole run-time reconfigurable field programmable gate array (FPGA) implemented on a single chip comprising:

a plurality of independent bi-directional data ports for receiving one or more data streams and outputting one or more data streams, each said data stream containing variable length self-configuring header information and variable length data;

a mesh of interconnected and configurable functional units capable of performing programmed arithmetic operations as defined by said header information; and an interconnection network responsive to said header information for configuring pathways interconnecting data ports and configurable functional units, said field programmable gate array being configurable at run-time through said plurality of independent bi-directional ports to partially reconfigure for one task while simultaneously performing computations for another task.

2. The data stream driven Worm-hole run-time reconfigurable field programmable gate array recited in claim 1 wherein said mesh of interconnected and configurable functional units comprises an array of interconnected functional unit cells, each cell within the array having four nearest neighbor connections, right and left edges of the array being connected as nearest neighbors forming a toroidal structure, cells along a top of the array receiving inputs from the interconnection network and one output from a bottom of each column of the array being fed back into the interconnection network.

3. The data stream driven Worm-hole run-time reconfigurable field programmable gate array recited in claim 2 further comprising skip bus connections consisting of bi-directional bus segments that run between nearest neighbor cells of the array, the skip bus segments being individually programmable to go in either direction and linked together, providing a data paths between arbitrary cells within the array.

4. The data stream driven Worm-hole run-time reconfigurable field programmable gate array recited in claim 3 wherein each of said function unit cells comprises:

first and second input registers for receiving operands;

a barrel shifter connected to said first register, said barrel shifter being programmable to conditionally shift to the left or to the right to facilitate implementation of multipliers and floating point arithmetic;

an arithmetic logic unit receiving as inputs outputs of the barrel shifter and the second input register; and a conditional unit connected to receive as inputs outputs of said arithmetic logic unit and said second register and selecting one input as an output.

5. The data stream driven Worm-hole run-time reconfigurable field programmable gate array recited in claim 4 wherein said interconnection network is a crossbar switch.

6. The data stream driven Worm-hole run-time reconfigurable field programmable gate array recited in claim 5 further comprising a dedicated multiplier connected to the crossbar switch for performing multiplication operations.

7. A method of allocating resources in a Worm-hole run-time reconfigurable field programmable gate array (FPGA), comprising the steps of:

inputting a plurality of data streams comprising a self-configuring header and data; and stripping configuration information from headers of said plurality of data streams and programming computational elements and interconnection resources in the system to form a self-steering stream paths within the system allowing said plurality of data streams to propagate through the field programmable gate array simultaneously.

8. The method of claim 7 wherein the self-configuring header is a variable size programming header and the data is variable size.

9. The method of claim 7 wherein the data streams are object oriented data streams and the self-configuring header contains codes which indicate types of operations to be performed, further comprising the steps of:

comparing the codes against a library of possible physical implementation strategies; and implementing an efficient method given available hardware resources in the system by mapping an allocation of available hardware to codes in the header.

10. The method of claim 7 wherein computational elements and interconnection resources in the field programmable gate array have addresses and headers of data streams are composed of packets containing addresses, the computational elements and interconnection resources responding only to packets containing their address or a broadcast address to form said self-steering stream paths.

11. The method of claim 10 further comprising the step of modifying addressing information within the header to provide dynamic resource allocation and function remapping allowing several competing processes to allocate resources in the field programmable gate array as they become available.

12. A data stream driven Worm-hole run-time reconfigurable field programmable gate array (FPGA), comprising:

a plurality of independent bi-directional data ports for receiving one or more data streams and outputting one or more data streams, each said data stream containing variable length self-configuring header information and variable length data;

a plurality of interconnected and configurable functional units capable of performing programmed operations as defined by said header information;

at least one interconnection network responsive to said header information for configuring pathways interconnecting data ports and configurable functional units; and at least one stream controller connected to said interconnection network, said field programmable gate array being dynamically configurable by said stream controller at run-time through said plurality of independent bi-directional ports to partially reconfigure for one task while simultaneously performing computations for another task.

* * * * *

UNITED STATES PATENT AND TRADEMARK OFFICE
CERTIFICATE OF CORRECTION

PATENT NO. : 5,828,858
DATED : October 27, 1998
INVENTOR(S) : Peter ATHANAS et al.

It is certified that error appears in the above-identified patent and that said Letters Patent is hereby corrected as shown below.

In column 1, beneath the title of the invention, insert the following:

This U.S. Government has a paid-up license in this invention and certain other rights as provided for by the terms of contract No. J-FBI-94-219 awarded by the Federal Bureau of Investigation.

Signed and Sealed this

Fifteenth Day of May, 2001

*Attest:*

NICHOLAS P. GODICI

*Attesting Officer*  *Acting Director of the United States Patent and Trademark Office*